United States Patent
Moline

[19]

[11] Patent Number: 6,050,180
[45] Date of Patent: Apr. 18, 2000

[54] FRUIT AND VEGETABLE JUICER

[75] Inventor: Gary Moline, San Dimas, Calif.

[73] Assignees: Omega Products, Inc., Harrisburg, Pa.; Moline Manufacturing, San Dimas, Calif.

[21] Appl. No.: 09/185,975

[22] Filed: Nov. 5, 1998

[51] Int. Cl.[7] .............................. A23N 1/00; A23N 1/02; A47J 19/02

[52] U.S. Cl. .............................. 99/511; 99/513; 241/37.5; 241/92; 426/51; 426/481; 426/489; 426/599

[58] Field of Search .............................. 99/484, 348, 489, 99/492, 495, 509–513; 210/360.1, 380.1, 369; 241/36, 37.5, 92, 282.1; 366/314, 601; 494/36, 43, 56, 58; 426/51, 478, 481, 489, 495, 533, 271, 615, 616, 643

[56] References Cited

U.S. PATENT DOCUMENTS

| | | | |
|---|---|---|---|
| 2,311,379 | 2/1943 | Gillanders | 99/512 |
| 2,845,971 | 8/1958 | Cordero | 99/512 |
| 3,892,365 | 7/1975 | Verdum | 241/282.1 X |
| 4,183,293 | 1/1980 | Arao et al. | 99/513 X |
| 4,345,517 | 8/1982 | Arao et al. | 99/511 |
| 4,506,601 | 3/1985 | Ramirez et al. | 99/511 |
| 4,614,153 | 9/1986 | Kurome et al. | 99/513 X |
| 4,681,031 | 7/1987 | Austad | 99/511 |
| 4,700,621 | 10/1987 | Elger | 99/513 X |
| 5,222,430 | 6/1993 | Wang | 99/511 X |
| 5,421,248 | 6/1995 | Hsu | 99/511 X |
| 5,433,144 | 7/1995 | Lee | 99/512 |
| 5,479,851 | 1/1996 | McClean et al. | 99/513 X |

Primary Examiner—Timothy Simone
Attorney, Agent, or Firm—Pillsbury Madison & Sutro LLP

[57] ABSTRACT

A fruit and vegetable juicer having a cover, a filter sieve, a collection bowl, a collection bowl top orifice, and a feeding tube located within the cover, wherein the cover has a helical recess extending upward from and in pulp-extraction communication with the collection bowl periphery. The helical recess in the cover also has a beginning portion and an ending portion in communication with a pulp outlet. The pulp outlet extends from the ending portion of the helical recess to provide controlled exit of the pulp from the helical recess for collection. The feeding tube is located in the cover so as to not disrupt pulp extraction through the helical recess, whereby pulp is efficiently and automatically extracted from the filter sieve area while the juice is collected in the collecting bowl.

14 Claims, 6 Drawing Sheets

FRUIT AND VEGETABLE JUICER

FIELD OF THE INVENTION

This invention relates generally to a fruit and vegetable juicer and in particular to a fruit and vegetable juicer having an improved cover shaped to provide automatic removal of dried or reduced pulp from a filter basket.

BACKGROUND OF THE INVENTION

Presently, various commercial fruit and vegetable juicers are available for extracting juice from fruits or vegetables. These devices are generally powered by an electric motor and have a filter assembly comprised of either a frusto-conical or a columnar, bowl-like filter sieve. These juicers contain a rotatable horizontal grating disk positioned in the filter sieve such that the filter sieve walls extend up and/or away from a periphery of the grating disk. A cover may have a passageway formed therein allowing fruits or vegetables to be pushed or forced into contact with the grating disk. Such a food pusher forces the fruit or vegetable through the passageway onto the surface of the grating disk.

While typical juicers may efficiently extract juice from fruits or vegetables, dried or reduced pulp often clogs the filter, sometimes very quickly, and is difficult to remove from the filter sieve area after the juice has been extracted.

The prior art addressed this problem in various ways. As an example, U.S. Pat. No. 5,421,248, to Hsu, discloses a dreg or food residue removal feature in which a stopper element is positioned in the open interior space of the filter assembly.

As the filter assembly spins, the stopper is engaged at a certain position. The dregs collect against the stopper and are forced upwardly against the interior wall of the filter assembly into numerous compartments. The filter housing is bowl-shaped and has vertical side walls. The drawbacks of the Hsu structure is that dried dregs or food residue clog in the top cover assembly. The user must then remove the assembly and manually extraction of the dregs. Other problems experienced include increased building costs; increased complexity in the top cover of the juicer; and increased likelihood of component breakdown. U.S. Pat. No. 5,433,144, to Lee, also discloses a scraper that is disposed in the filter assembly and positioned to force dregs or residue up and out of the filter assembly and into a trash receptacle.

As another example, U.S. Pat. No. 4,506,601, to Ramirez et al., discloses a fruit and vegetable juicer having a frusto-conical filter basket. In Ramirez, a pulp discharge control means comprises a cylindrical rim or circular band having flexible vanes attached to the rim such that the vanes flex and extend radially outward due to centrifugal forces when the spindle rotates. The discharge means are disposed in the filter basket. As the filter basket spins, the vanes push outwardly and press the pulp against the filter basket. Eventually the pulp is forced up and discharged through an outlet duct. This configuration exhibits some of the same short-comings as described above. Dried pulp lodges in the outlet duct or under the top cover. The increased mechanical complexity of the pulp discharge element is costly to build and more susceptible to mechanical breakdown.

As another example, U.S. Pat. No. 4,700,621, to Elger, and U.S. Pat. No. 5,479,851, to McClean et al., both disclose a fruit and vegetable juicer having a frustro-conical filter basket and passageways which serve to direct pulp to a collection area. However, the pulp lodges in the top cover at various locations. In Elger, the pulp creeps up the surface of the filter basket and must be caught in a "pulp trough." The top cover assembly still must periodically be removed to clean out the passageways and underside of the top cover to further use the juicer.

Similarly, in McClean et al., the top cover 15 can easily clog as pulp is extracted from the filter basket. The McClean cover provides little space and no efficient guiding surfaces to control the pulp extraction path. This can be understood from FIG. 3 of the reference.

SUMMARY OF THE INVENTION

What is needed in the art is a fruit and vegetable juicer having a top cover which is designed to efficiently extract the pulp without requiring periodic cleansing and/or top removal, manual cleaning, and which is economical to build and durable.

The object of the present invention is to provide a fruit and vegetable juicer in which the dried or reduced pulp may be automatically removed from the filter basket area without clogging either the filter or the unit itself.

A further object of this invention is to provide a fruit and vegetable juicer that is economical to build.

A further object of this invention is to provide a fruit and vegetable juicer which affords automatic extraction of pulp without a complicated top cover assembly.

A still further objective of this invention is to provide a fruit and vegetable juicer having a top cover permits the automatic discharge of reduced or dried fruit/vegetables yet which is easily removed and simple and speedy to clean when it is desirable to do so.

The present invention provides a fruit and vegetable juicer comprising a motor housing base enclosing a motor drive and a drive shaft, a horizontal grating disk with a grating-disk central hub, the grating disk being rotatable about a substantially vertical axis, a substantially frusto-conical filter sieve receiving the grating disk such that the grating disk is positioned in the filter sieve on a bottom portion wherein the filter sieve walls extend upwardly and outwardly from a periphery of the grating disk, and the filter sieve having a sieve central hub configured for connecting and disconnecting the filter sieve to and from the drive shaft.

There is no restriction regarding the shape of the filter sieve. In the preferred embodiment the sides of the filter sieve project outwardly and upwardly, or in a frusto-conical configuration, to facilitate extraction of pulp. Other embodiments of the motor drive, grating disk and sieve filter which accomplish efficient extraction in conjunction with the top cover disclosed herein are also contemplated.

The drive shaft projects through the sieve central hub and is adapted to receive and engage the grating disk through the grating-disk central hub, wherein the sieve and the grating disk are rotated by the motor around a substantially vertical axis.

A collection bowl has a center mounting opening and having a top orifice, wherein the collecting bowl comprises a top cover supporting portion which substantially defines the top orifice, an annular vertical wall having an inside surface located around the outer periphery of the filter sieve, an annular inside flange raised from the inside surface of the annular vertical wall, a juice chamber defined within the annular inside flange around the center mounting opening of the collection bowl, and a juice outlet for guiding juice out of the juice chamber. The collection bowl is adaptable so as to be easily mountable and removable from the motor housing base. This provides for simple removal of the filter basket for cleaning after the juicing process is accomplished.

A top cover is removably engaged to the top cover supporting portion. The top cover comprises a feed tube through which fruits and vegetables are inserted into the filter sieve and is arranged above the grating disk so that food may be pushed down or forced to contact the grating disk. A food pusher inserted into the feed tube enables the user to press fruit and vegetables down onto the grating disk for grating.

The pulp and juice thereby produced fly upwardly and outwardly and the juice passes through the filter sieve for collection while the pulp passes over the filter sieve for extraction through the top cover discussed herein.

A helical recess in the top cover extends upward from and in pulp-extraction communication with the collection bowl top orifice. A pulp outlet is in pulp-extraction communication with the helical recess and extends away from the helical recess to provide a controlled passageway from the top cover for collection.

The feeding tube is located in the top cover so as to not disrupt pulp extraction along the helical recess, whereby pulp is efficiently extracted from the filter sieve while the juice is collected in the collecting bowl.

DESCRIPTION OF THE PREFERRED EMBODIMENT

Figure 1:
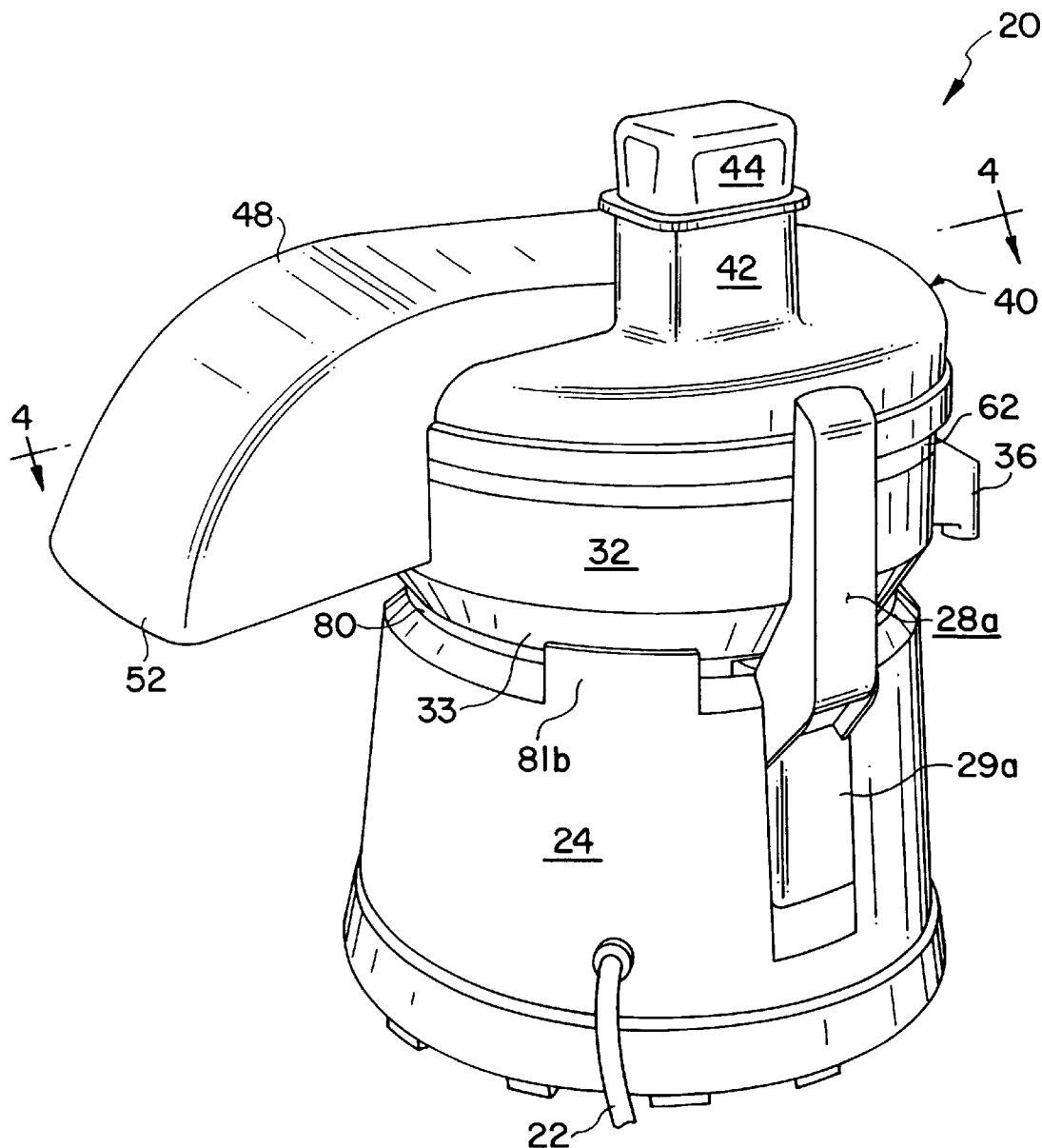
FIG. 1 is a perspective view of the juicer in accordance with the present invention.
Figure 2:
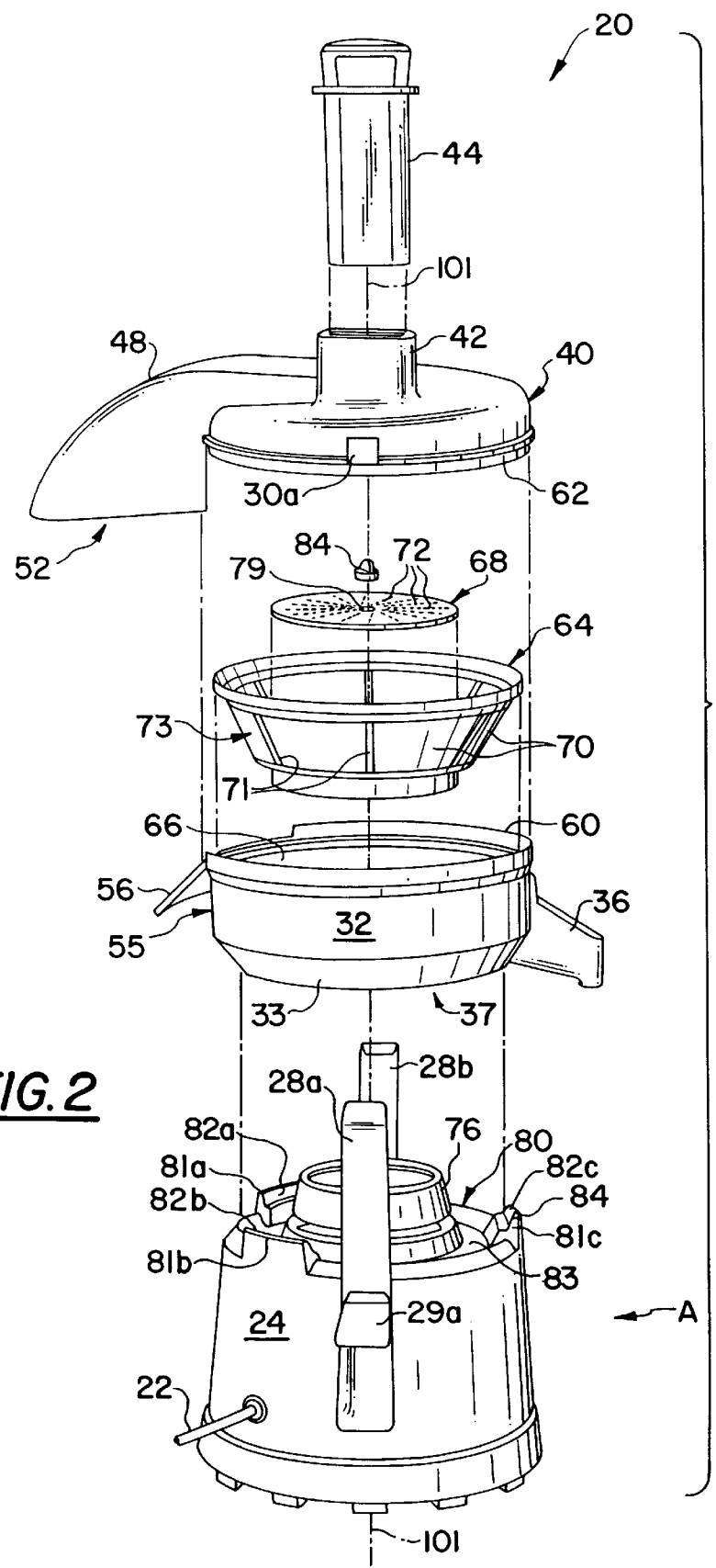
FIG. 2 is an exploded perspective view of FIG. 1.

A typical embodiment of the present invention is illustrated in FIGS. 1 and 2. The fruit and vegetable juicer 20 has a top cover 40, a collection bowl 32, and a collection bowl top supporting portion 62 which defines a collection bowl orifice 66. The juicer 20 has a left and right attaching arm 28a and 28b, respectively. A power cord 22 is attached to the juicer motor housing base 24, which houses the electric motor 26, shown in FIG. 4. The collection bowl pour spout 36 provides an exit pathway for the extracted juice. The top cover 40 of the juicer 20 includes a feeding tube 42 for providing an opening into the fruit and vegetable juicer and for guiding the food pusher 44. The top cover 40 has a helical shape such that dried pulp is extracted around the loop and at a high point 48 in the top cover 40. The dried pulp then exits the top cover 40 from the exit port or pulp outlet 52, which is in pulp-extraction communication with the helical recess. A more detailed discussion of the helical shape is provided below with respect to FIG. 7.

Figure 4:
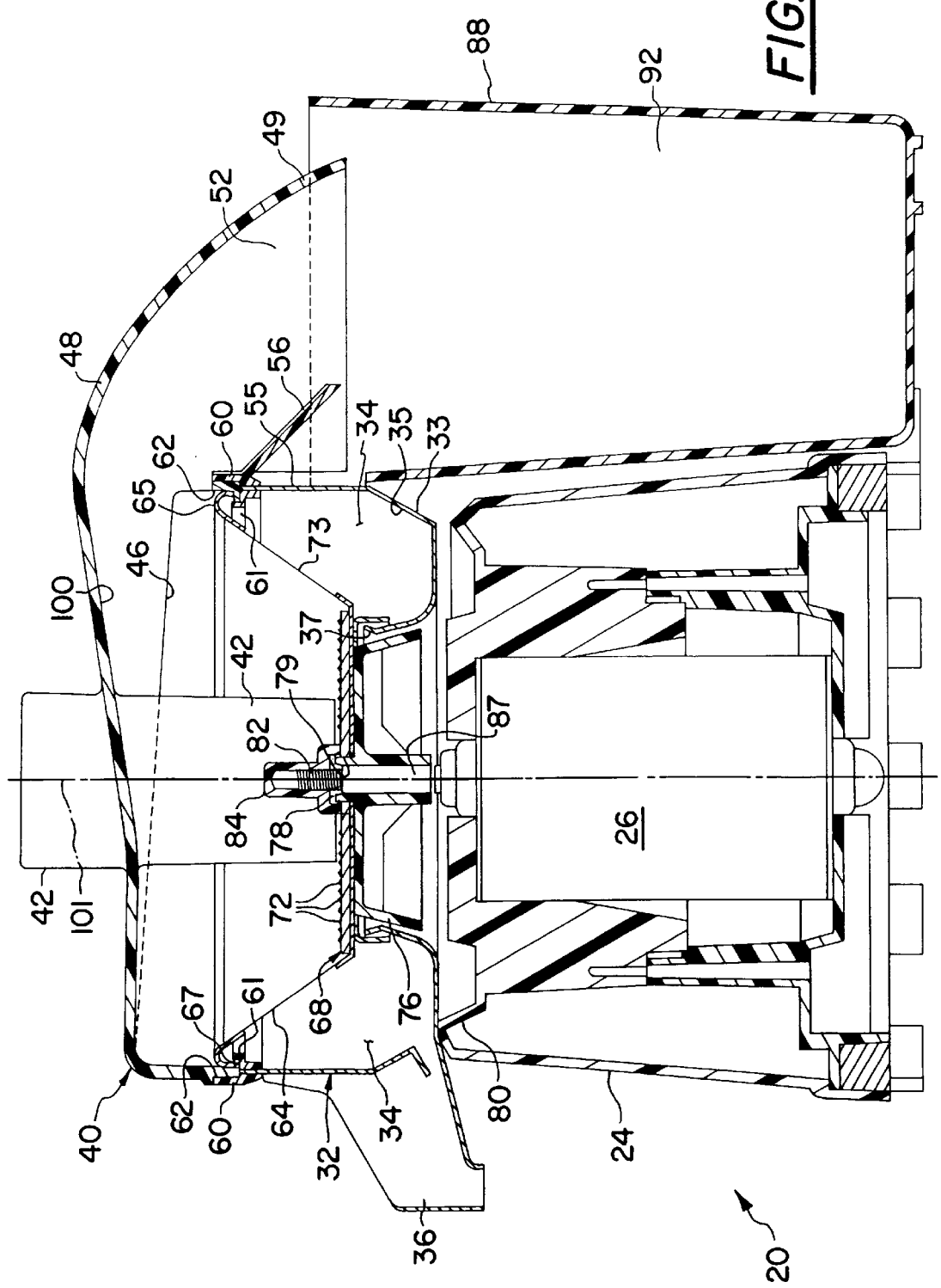
FIG. 4 is a cross-sectional view of one embodiment of the present invention taken along line 4—4 in FIG. 1.

Referring to FIGS. 2 and 4, the motor housing base 24 of the juicer 20 has a collection bowl supporting surface 80, comprising collection bowl supporting flanges 81a, 81b and 81c, which is configured to secure the collection bowl 32. The collection bowl 32 is stationary and positioned on the motor housing base 24. The collection bowl 32 has a bottom orifice 37 providing an opening whereby the bowl may fit annularly around the filter basket support 76, which has a center mounting configuration 78, preferably hexagonal in shape, from which a screw rod 82 extends vertically. The collection bowl has a top orifice 66 through which the filter basket 64 and grating disk 68 may pass to be seated on the filter basket support 76.

The filter basket 64 has side walls 73 frusto-conical in shape or other configurations. The side walls 73 have meshed peripheral wall sections 70 through which juice flows to the juice chamber 34. Side wall supporting structures 71 provide stability and strength to the filter basket 64.

The filter basket 64 includes a bottom portion 63 which is welded to side walls 73. The bottom portion 63 supports the grating disk 68 and a center hole periphery defines a grating disk center hole 79. The screw rod 82 passes through the center hole 77 of the filter basket 64, shown in FIG. 5, and the center hole of the grating disk 79. A cap nit 84 is threaded onto the screw rod 87 to hold the grating disk 68 and the filter basket 64 together.

A pulp-extraction flange 56 extends from the annular vertical wall of the collection bowl 32 for preventing dried pulp from dripping along the outer surface 55 of the collection bowl 32. A juice spout 36 provides an outlet from the collection bowl 32 for juice which has been extracted from the fruits and vegetables and collected in the juice chamber 34.

The right attaching arm 28a and left attaching arm 28b have corresponding right and left attachment flanges 30a and 30b, respectively, on the top cover 40. The attachment arms 28a and 28b can be released by attachment levers 29a and 29b respectively. The attachment levers 29a and 29b operate to raise and extend the distal ends of the attachment arms 28a and 28b, which distal ends are shaped to engage the attachment flanges 30a and 30b and lock down so as to firmly hold the top cover 40 in place.

An annular top-cover-supporting portion 60 of the collection bowl 32 is shaped to engage a bottom-engaging surface 62 of cover 40. The relationship between the top cover 40, collection bowl 32 and Eilter sieve 64 shown in FIG. 4 is illustrated in more detail in FIG. 8. The top-cover-supporting portion 60 of the collection bowl 32 has an annular groove 67 which engagingly receives a depending edge portion 62 of cover 40, and also receives, on a radially inwardly extending edge 61, an arcuately down-turned extension 64 of the filter basket wall 73. Neither the top supporting portion 62 nor the inwardly extending edge 61 engages the filter basket 64, which enables the basket 64 to spin about its axis 101 for extracting juice from fruits and vegetables. The arcuate downturning extension 65 of the top portion of the filter basket wall 73 provides clear flow of dried pulp to the helical recess 100, shown in FIG. 7, in the top cover 40 for expulsion of the dried pulp. The above relationship facilitates separation of the juice from the dried pulp by preventing pulp from accumulating in the collection bowl 34.

Figure 3:
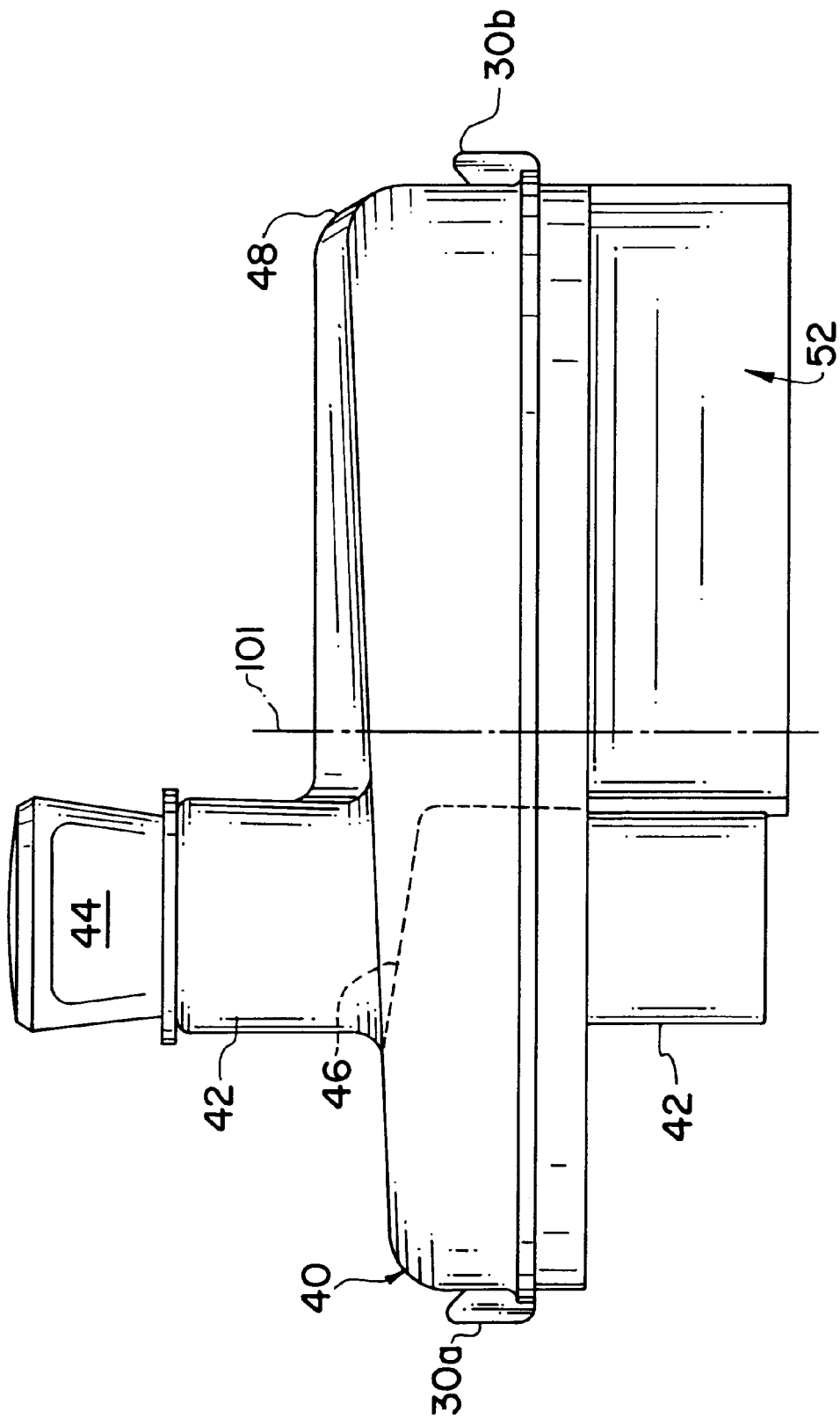
FIG. 3 is an elevational view of the top cover.

In FIG. 3 showing the cover 40, the location of the feeding tube 42, with the food pusher 44 inserted is shown as being off-center from the central axis 101. The shape of the attachment flanges 30a and 30b on opposite sides of the top is also illustrated. The helical configuration of cover 40 also shown in FIG. 7, begins at the lowest elevation point 46 of the underside of cover 40 and the elevation of that interior surface continually increases in a helical pattern until it reaches an apex 48. From the apex 48, the interior surface 100 extends horizontally and then downward until terminates to provide a passageway 52 to direct the dried or reduced pulp out and away from the juicer 20 by way of the extraction passageway 52.

FIG. 4 is a cross-sectional view of the juicer of FIG. 1, with the addition of a dried or reduced pulp receptacle 88. A motor drive 26 is located within the motor drive housing 24 that in turn, includes a collection bowl supporting surface 80 with three collection bowl supporting flanges 81a, 81b and 81c, which extend horizontally from the supporting surface 80. These flanges are illustrated in FIG. 2. The bottom surface 33 of the collection bowl 32 slants downward and inward so as to partially define the inner flange 35 of the juice chamber 34.

Referring again to FIG. 2, as the collection bowl 32 is placed onto the motor housing base 24, the bottom surface 33 of the collection bowl 32 engages collection bowl supporting surfaces 82a, 82b and 82c on the supporting flanges 81a, 81b, and 81c, respectively. The collection bowl supporting flange 81c has a radially extending groove 84, with reference to the central axis 101, which engagingly receives the pour spout 36. In this way, the collection bowl 32 is positioned onto the motor housing base 24.

Figure 5:
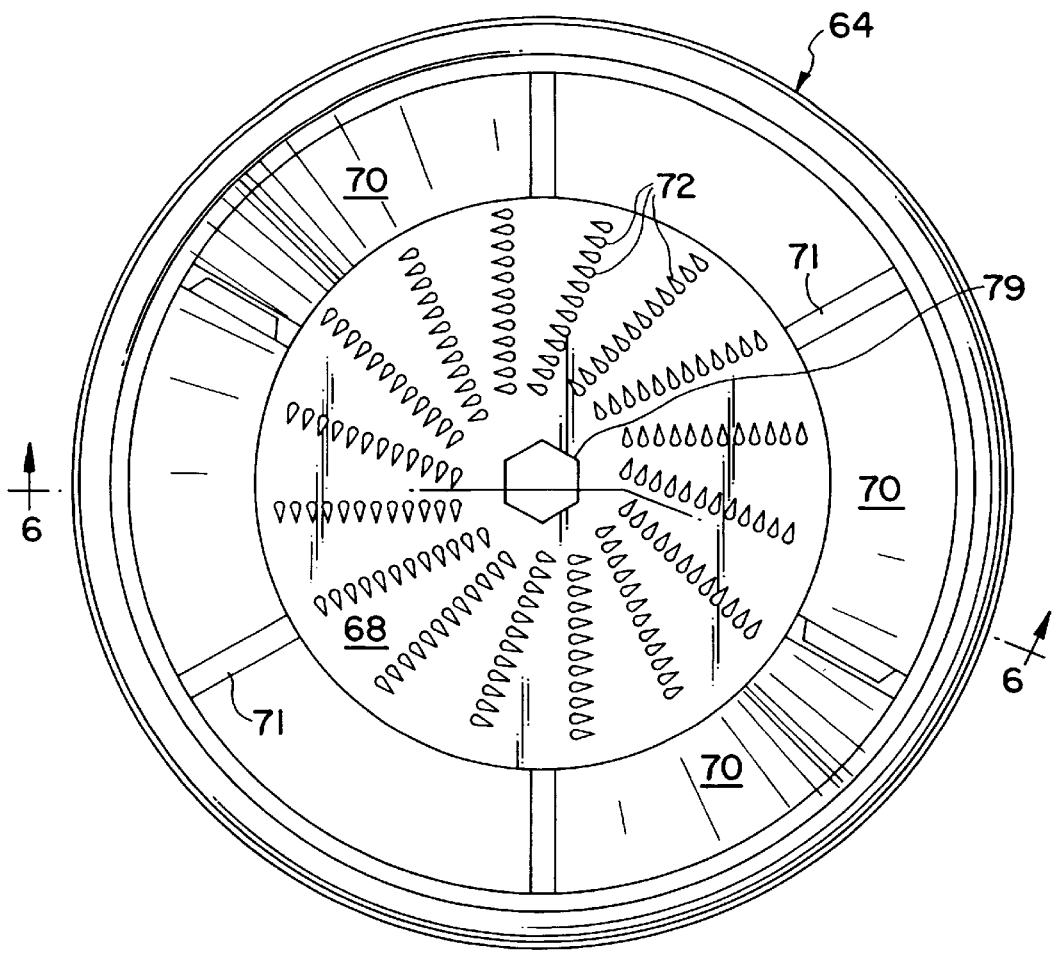
FIG. 5 is a top plan view of the filter basket with the inserted grating disc.

With further reference to FIG. 4, screw rod 87 extends vertically through the filter basket center hole 77 and the grating disk center hole 79. As shown in FIG. 5, holes 77 and 79 are shaped, for example, as a hexagon, although other shapes such as oval, square or triangular, could also be used. The rod 87, below its threaded end 82, is shaped to be complimentary to the shape of holes 77/79. This assures a positive drive occurs by rod 87. A cap nut 84 is threadingly screwed onto the threaded outer end 82 of screw rod 87 to secure the filter basket 64 and the grating disk 68 onto the motor housing 24. The pour spout 36 provides an outlet for discharging the extracted juice from the juice chamber 34.

The top cover 40 is secured by its receiving surface 62 into the annular groove 67 in the cover supporting surface 60. The arcuately down-turned extension 65 of the outer periphery of the filter basket side wall 73 is also unengagingly and rotably received annular groove 67. The side wall extension 65 is unengagingly received so as to allow the filter basket 64 to spin yet provide continuity between the filter basket 64 and cover 40, thereby allowing the dried or reduced pulp to freely pass to the top cover helical recess. The position of the feed tube 42 may be seen as offset from, or behind in this view, the center axis 101.

Figure 7:
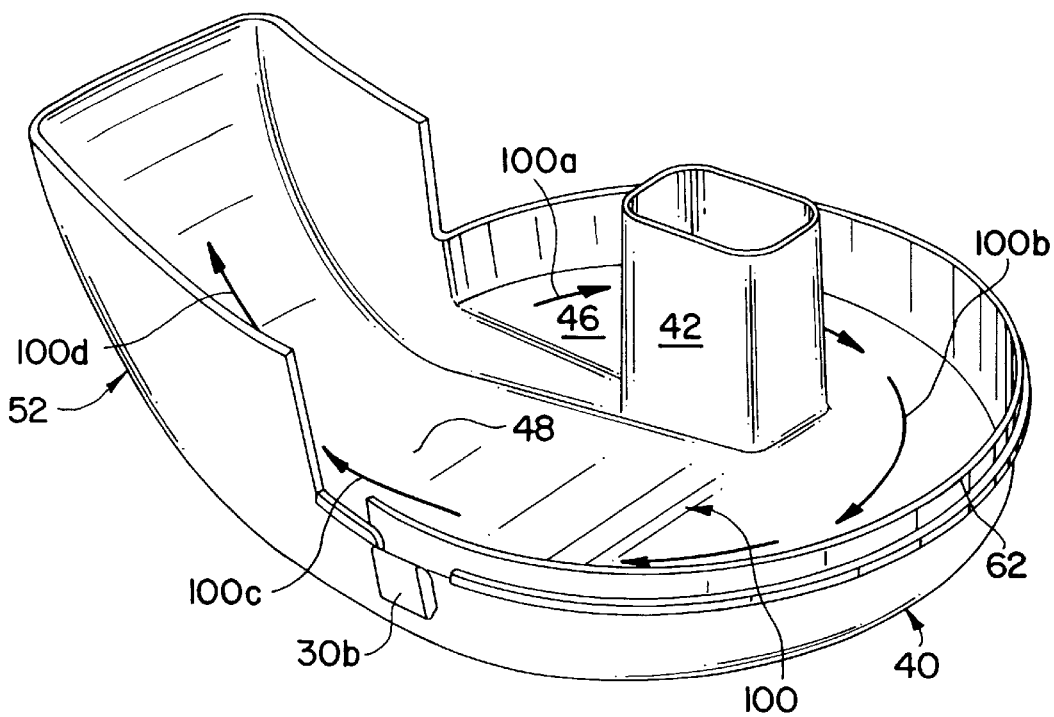
FIG. 7 is a perspective view of the underside of the top cover, showing the helical design and shape which allows for more efficient pulp extraction.
Figure 8:
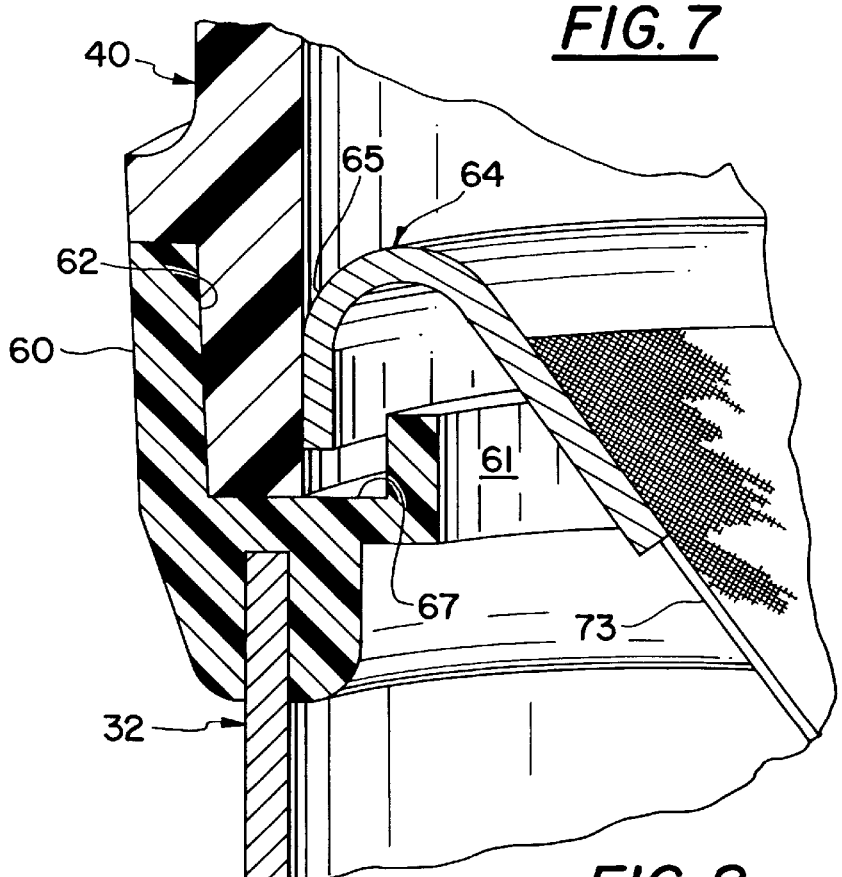
FIG. 8 is a detailed sectional view of the relationship between the top cover, collection bowl, and the filter sieve.

The cross-section view in FIG. 4, together with FIG. 7, illustrate the design of the helical recess 100. The helical configuration begins at the lowest elevational point 46. Then the undersurface of the top cover increases in elevation 100a, circumnavigating 100b the feed tube 42, until the surface reaches its apex 48. At this point, the shape of cover 40 arcuately progresses from horizontal at 48 to nearing vertical 100d at the distal end of the top cover helical path 49. Following the flow path 100a–100d in the helical recess 100 the dried pulp thus exits the top cover and may be gathered in a trash receptacle 88. A guide flange 56 extends from the top supporting surface 60 of the collection bowl 32 to aid in guiding the dried pulp away from the outer surface 55 of the collection bowl 32.

FIG. 5 illustrates a top view of the filter basket 64 with the grating disk 68 placed therein. A plurality of radial rows of grating teeth 72 are formed around the top surface of the grating disk. The central hole 79 of the grating disk and the central hole 77 of the filter basket, and, as noted previously, are preferably hexagonal in shape, but may be other configurations. These holes match the exterior shape of center mounting configuration 78 to provide a secure engagement between the structures.

Figure 6:
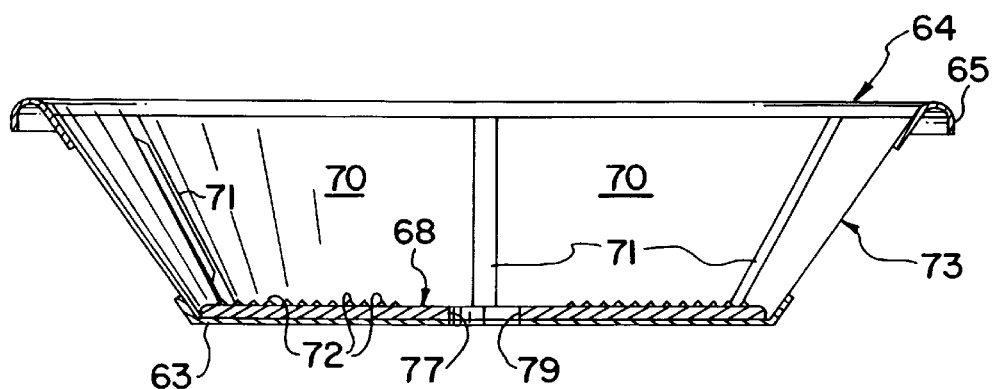
FIG. 6 is a sectional view of FIG. 5 along the line 6—6.

FIG. 6 illustrates a cross-sectional view of the filter basket 64 and grating disk 68, and further illustrates the shape of the annular arcuately downwardly extending wall portion 65 in the top of the filter basket 64.

FIG. 7 is a perspective view illustrating the helical shape of the underside surface 100 of the top cover 40. Arrows 100a–100d illustrate the flow path taken by dried pulp which is in the process of being extruded from the filter basket and juicer in general. First, the material to be ground flows down the inlet tube 42 end is ground by teeth 72. As pulp forms it is moved outwardly against the mesh side-walls 73 and then begins to move up that angled surface due to centrifugal force. When the pulp reaches the top edge of filter basket 64 the pulp is then thrown and forced into the helical passage 100 in cover 40 and initially moves in the direction of arrow 100a. This area corresponds to the lowest elevational point 46 of helical surface 100. Following along that helical path, arrow 100b illustrates the upward and helical movement of the extruding pulp and of the underside surface 100 of cover 40. The helical passage generally along arrow 100b increases in width and elevation around the feeding tube 42.

Arrow 100c illustrates the flow path followed by the pulp along the highest elevational point 48 of the underside surface 100 which leads to arrow 100d, which illustrates the downward turning flow path of cover 40 that directs passage of the dried pulp to a collection receptacle. It is noted that the top cover 40 is turned upside-down in FIG. 7 for the purpose of viewing the helical recess. The above description is for a top cover 40 in operation, when the top cover is positioned on the collection bowl 32. Accordingly, although arrow 100d is pointing up in FIG. 7, in operation, arrow 100d illustrates the downward movement of dried pulp as it exits the top cover.

FIG. 7 also illustrates the connecting arm flange 30b in the top cover 40; the top cover receiving annular surface 62; and the location of the feeding tube 42 in cover 40 relative to the helical flow path 100. In the preferred embodiment, the beginning portion 46 of the helical path 100 may be narrower than the ending portion adjacent the highest region at 48.

While only one embodiment of the present invention has been shown and described, it will be understood that various modifications and changes could be made without departing from the spirit and scope of the invention. For example, the helical path through which the dried pulp passes does not necessarily have to be narrow at the beginning and. broad at the end. Other configurations and widths throughout the helical path are contemplated.

Thus the scope of the invention should be determined by the appended claims and their legal equivalents, rather than by the examples given.

I claim:

1. A fruit and vegetable juicer having a cover, a filter sieve, a collection bowl, a grinding mechanism, and a drive unit, the cover comprising:

an interior helical recess extending upward from and in pulp-extraction communication with a collection bowl orifice, whereby pulp is grated by said grinding mechanism, extracted from the filter sieve and transported along said helical recess while juice is separately collected in said collecting bowl.

2. The fruit and vegetable juicer of claim 1, wherein a feeding tube is located in said cover and positioned at a location off-set from a central vertical axis of said cover so as to not disrupt pulp extraction along the helical recess.

3. The fruit and vegetable juicer of claim 1, wherein a beginning portion of the helical recess is narrower than an ending portion of the helical recess.

4. The fruit and vegetable juicer of claim 1, wherein a pulp-extraction flange extends outwardly and downwardly from a segment of said cover supporting portion, said pulp-extraction flange positioned below a pulp outlet and shaped so as to prevent the extracted pulp from dripping down an outer surface of the collection bowl and motor housing base.

5. The fruit and vegetable juicer of claim 1 wherein the filter sieve has substantially frusto-conical sides.

6. The fruit and vegetable juicer of claim 1, wherein said helical recess includes an ending portion and a pulp outlet in pulp-extraction communication with said ending portion.

7. The fruit and vegetable juicer of claim 6, wherein said pulp outlet extends away from said ending portion thereby defining a pathway for pulp to emerge from said helical recess for collection.

8. In a fruit and vegetable juicer having a motor housing base, a filter sieve, a collection bowl having a cover supporting portion which defines a collection bowl orifice, and a cover, the cover comprising:

an interior helical recess extending upward from and in pulp-extraction communication with said collection bowl orifice, said helical recess having an ending portion; and a pulp outlet in pulp-extraction communication with said helical recess extending in a substantially horizontal direction from said ending portion and terminating with a downward angling portion.

9. The fruit and vegetable juicer of claim 6 or 8, further comprising:

a feeding tube in said cover and positioned at a location off-set from a central vertical axis of said cover so as to not disrupt pulp extraction through said helical recess, whereby pulp is efficiently extracted from the filter sieve and transported through said helical recess while juice is separately collected in the collecting bowl.

10. The fruit and vegetable juicer of claim 6 or 8, further comprising:

a pulp-extraction flange extending outwardly from said cover supporting portion positioned to be below the pulp outlet and shaped so as to prevent extracted pulp from dripping down an outer surface of the collection bowl and motor housing base.

11. The fruit and vegetable juicer of claim 6, further comprising a filter sieve having substantially frusto-conical sides.

12. A method of collecting juice from a fruit or vegetable in a collection bowl having a collection bowl orifice and extracting pulp from the fruit or vegetable through a pulp-extraction cover and outlet, comprising the steps of:

inserting the fruit or vegetable into a feed tube which guides the same onto a rotating grating disk integral with a rotating filter sieve;

grating the fruit or vegetable on the grating disk and separating juice from grated pulp;

causing the grated pulp to quickly fly outwardly in a radial direction due to rotation of the grating disk and filter sieve;

collecting the juice forced through the sieve into a collection bowl;

extracting the grated pulp through an upwardly extending helical recess in the cover, said cover being in pulp-extraction communication with the collection bowl orifice and a having an ending portion which is in pulp-extraction communication with a pulp outlet, wherein the pulp is extracted away from the filter sieve area.

13. A fruit and vegetable juicer, comprising:

a motor housing base enclosing a motor drive and having a drive shaft, a horizontal grating disk having a grating-disk central hub, said grating disk being rotatable about a substantially vertical axis, a substantially frusto-conical filter sieve surrounding the grating disk and being integral with the grating disk, said filter sieve having sides which project upwardly and outwardly from the grating disk, and the filter sieve having a sieve central hub configured for connecting and disconnecting the filter sieve to and from the drive shaft;

said drive shaft projecting through the sieve central hub and adapted to receive and engage the grating disk through the grating-disk central hub, wherein the sieve and the grating disk are rotated by the motor around a substantially vertical axis;

a collection bowl having a center mounting opening and a top orifice, said collecting bowl comprising a cover supporting portion which substantially defines the top orifice, an annular vertical wall having an inside surface located around the outer periphery of the filter sieve, an annular inside flange raised from the inside surface of the annular vertical wall, a juice chamber defined within the annular inside flange around the center mounting opening of the collection bowl, and a juice outlet for guiding juice out of the juice chamber;

a cover removably engaged to said cover supporting portion, the cover comprising a feed tube through which fruits and vegetables are inserted into the filter sieve and the feed tube arranged above the grating disk; and a food pusher insertable into said feed tube and to press fruit and vegetable down onto the grating disk for grating so that pulp and juice thereby produced fly upwardly and outwardly and the juice passes through said filter sieve for collection while the pulp passes over the filter sieve for extraction.

14. The fruit and vegetable juicer of claim 13, wherein said cover further comprises:

a helical recess extending upward from and in pulp-extraction communication with the collection bowl top orifice, said helical recess having an ending portion;

a pulp outlet in pulp-extraction communication with the helical recess extending in a substantially horizontal direction from the ending portion and angling downward towards a vertical direction, the feeding tube located in the cover so as to not disrupt pulp extraction through the helical recess, whereby pulp is efficiently extracted from the filter sieve while the juice is; collected in the collecting bowl.

* * * * *